(12) United States Patent
Zhang et al.

(10) Patent No.: US 8,287,836 B2
(45) Date of Patent: Oct. 16, 2012

(54) METHOD FOR PREPARING SINGLE WALLED CARBON NANOTUBES

(75) Inventors: Xinjie Zhang, Waltham, MA (US); Jun Ma, Lexington, MA (US); Howard Tennent, Kennett Square, PA (US); Robert Hoch, Hensonville, NY (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 459 days.

(21) Appl. No.: 11/841,952

(22) Filed: Aug. 20, 2007

(65) Prior Publication Data

US 2008/0175786 A1 Jul. 24, 2008

Related U.S. Application Data

(63) Continuation of application No. 11/281,571, filed on Nov. 16, 2005, now Pat. No. 7,862,795.

(60) Provisional application No. 60/630,946, filed on Nov. 24, 2004, provisional application No. 60/630,781, filed on Nov. 24, 2004, provisional application No. 60/628,498, filed on Nov. 16, 2004.

(51) Int. Cl.
*D01F 9/12* (2006.01)
*B82B 3/00* (2006.01)
(52) U.S. Cl. .................... 423/447.3; 977/843
(58) Field of Classification Search ............. 423/447.3; 977/843
See application file for complete search history.

(56) References Cited

U.S. PATENT DOCUMENTS

| | | | |
|---|---|---|---|
| 4,663,230 A | 5/1987 | Tennent | |
| 5,165,909 A | 11/1992 | Tennent | |
| 5,171,560 A | 12/1992 | Tennent | |
| 5,424,054 A | 6/1995 | Bethune et al. | |
| 5,456,897 A | 10/1995 | Moy et al. | |
| 5,500,200 A | 3/1996 | Mandeville et al. | |
| 5,569,635 A | 10/1996 | Moy et al. | |
| 5,707,916 A | 1/1998 | Snyder et al. | |
| 5,968,650 A | 10/1999 | Tennent et al. | |
| 6,333,016 B1 | 12/2001 | Resasco et al. | |
| 6,383,966 B1 | 5/2002 | Han et al. | |
| 6,413,487 B1 | 7/2002 | Resasco et al. | |
| 6,432,866 B1 | 8/2002 | Tennent et al. | |
| 6,692,717 B1 | 2/2004 | Smalley et al. | |
| 6,730,284 B2 | 5/2004 | Harutyunyan et al. | |
| 6,761,870 B1 | 7/2004 | Smalley et al. | |
| 2002/0121460 A1 | 9/2002 | Moy et al. | |
| 2003/0039604 A1 | 2/2003 | Niu et al. | |
| 2003/0086858 A1 | 5/2003 | Niu et al. | |
| 2003/0181526 A1 | 9/2003 | Bhagwat et al. | |
| 2008/0031802 A1 | 2/2008 | Ma et al. | |

FOREIGN PATENT DOCUMENTS

| | | |
|---|---|---|
| JP | 2001250468 A | 9/2001 |
| JP | 2003146631 A | 5/2003 |
| JP | 2003252613 A | 9/2003 |
| WO | 8907163 A1 | 8/1989 |
| WO | 9105089 A1 | 4/1991 |
| WO | 03068676 A1 | 8/2003 |
| WO | 2004071654 A1 | 8/2004 |

OTHER PUBLICATIONS

Baker and Harris, Chemistry and Physics of Carbon, Walker and Thrower (ed.), vol. 14, 1978, p. 83.
Bethune, D S, et al., "Cobalt-catalysed growth of carbon nanotubes with single-atomic-layer walls," Nature, vol. 363, p. 605-607 (1993).
Dai, H., et al., "Single-Wall Nanotubes Produced by Metal-Catalyzed Disproportionation of Carbon Monoxide", Chemical Physics Letters 260: 471-475 (1996).
de Heer, Walt A., "Nanotubes and the Pursuit of Applications," MRS Bulletin, Apr. 2004.
Dresselhaus, M.S., et al., "Single Nanotube Raman Spectroscopy," Accounts of Chemical Research, vol. 35, No. 12, pp. 1070-1078 (2002).
Guo, T., et al., "Catalytic growth of single-walled nanotubes by laser vaporization" Chem. Phys. Lett. vol. 243: Issues 1-2: pp. 49-54 (1995).
Iijima, S. "Helical microtubules of graphitic carbon," Nature 354:56-58 (1991).
Iijima, S. and Ichihashi,T. "Single-shell carbon nanotubes of 1-nm diameter", Nature, vol. 363, pp. 603-605 (1993).
Kitiyanan, B., "Controlled production of single-wall carbon nanotubes by catalytic decomposition of CO on bimetallic Co—Mo catalysts," Chemical Physics Letters, 317, pp. 497-503 (2000).
Maruyama, et al., "Low-temperature synthesis of high-purity single walled carbon nanotubes from alcohol," Chemical Physics Letters, 360, pp. 229-234 (2002).
Oberlin, A. & Endo, M., "Filamentous Growth of Carbon Through Benzene Decomposition," J. of Crystal Growth, vol. 32, pp. 335-349 (1976).
Rodriguez, N., "A Review of Catalytically Grown Carbon Nanofibers," J. Mater. Research, vol. 8, pp. 3233-3250 (1993).
Thess, A., et al., "Crystalline Ropes of Metallic Carbon Nanotubes," Science, 273:483-487 (1996).
Weaver, J.H., "Totally Tubular," Science 265, pp. 611-612 (1994).

*Primary Examiner* — Stuart Hendrickson
(74) *Attorney, Agent, or Firm* — Lewis J. Kreisler; Asaf Batelman

(57) ABSTRACT

Methods of preparing single walled carbon nanotubes are provided. Carbon containing gas is contacted with a supported metal catalyst under reaction conditions to yield at least 90% single walled carbon nanotubes and at least 1 gram single walled carbon nanotubes/gram metal catalyst. The support material may be calcined at temperatures between 150 and 600° C., and may have at least one oxidized planar surface. Reaction conditions include less than 10 atmospheres pressure and less than 800° C.

2 Claims, 8 Drawing Sheets

METHOD FOR PREPARING SINGLE WALLED CARBON NANOTUBES

CROSS REFERENCE INFORMATION

This is a continuation of U.S. Ser. No. 11/281,571 filed Nov. 16, 2005, currently pending which claims benefit to and priority of U.S. Provisional Application No. 60/630,946, filed Nov. 24, 2004, U.S. Provisional Application No. 60/630,781, filed Nov. 24, 2004 and U.S. Provisional Application No. 60/628,498, filed Nov. 16, 2004, each of which is are hereby incorporated by reference in its entirety.

BACKGROUND OF THE INVENTION

1. Field of Invention

The invention relates to methods for preparing single walled carbon nanotubes. More specifically, the invention relates to methods for preparing a bundle or a densely packed array of single walled carbon nanotubes under commercially viable reaction conditions.

2. Description of the Related Art

Carbon Nanotubes

This invention lies in the field of carbon nanotubes (also known as fibrils). Carbon nanotubes are vermicular carbon deposits having diameters less than $1.0\mu$, preferably less than $0.5\mu$, and even more preferably less than $0.2\mu$. Carbon nanotubes can be either multi walled (i.e., have more than one graphene layer more or less parallel to the nanotube axis) or single walled (i.e., have only a single graphene layer parallel to the nanotube axis). Other types of carbon nanotubes are also known, such as fishbone fibrils (e.g., wherein the graphene layers are arranged in a herringbone pattern, compared to the tube axis), etc. As produced, carbon nanotubes may be in the form of discrete nanotubes, aggregates of nanotubes (i.e., dense, microscopic particulate structure comprising entangled carbon nanotubes) or a mixture of both.

Carbon nanotubes are distinguishable from commercially available continuous carbon fibers. For instance, diameter of continuous carbon fibers, which is always greater than $1.0\mu$ and typically 5 to $7\mu$, is far larger than that of carbon nanotubes, which is usually less than $1.0\mu$. Carbon nanotubes also have vastly superior strength and conductivity than carbon fibers.

Carbon nanotubes also differ physically and chemically from other forms of carbon such as standard graphite and carbon black. Standard graphite, because of its structure, can undergo oxidation to almost complete saturation. Moreover, carbon black is an amorphous carbon generally in the form of spheroidal particles having a graphene structure, such as carbon layers around a disordered nucleus. On the other hand, carbon nanotubes have one or more layers of ordered graphitic carbon atoms disposed substantially concentrically about the cylindrical axis of the nanotube. These differences, among others, make graphite and carbon black poor predictors of carbon nanotube chemistry.

It has been further accepted that multi walled and single walled carbon nanotubes are also different from each other. For example, multi walled carbon nanotubes have multiple layers of graphite along the nanotube axis while single walled carbon nanotubes only have a single graphitic layer on the nanotube axis.

The methods of producing multi walled carbon nanotubes also differ from the methods used to produce single walled carbon nanotubes. Specifically, different combinations of catalysts, catalyst supports, raw materials and reaction conditions are required to yield multi walled versus single walled carbon nanotubes. Certain combinations will also yield a mixture of multi walled and single walled carbon nanotubes.

As such, two characteristics are often examined in order to determine whether such process will be commercially feasible for the production of a desired carbon nanotube on an industrial scale. The first is catalyst selectivity (e.g., will the catalyst yield primarily single wall carbon nanotubes or primarily multi-walled carbon nanotubes or other forms of carbon products?). The second is catalyst yield (e.g., weight of carbon product generated per weight of catalyst used).

Processes for forming multi walled carbon nanotubes are well known. E.g., Baker and Harris, *Chemistry and Physics of Carbon*, Walker and Thrower ed., Vol. 14, 1978, p. 83; Rodriguez, N., *J. Mater. Research*, Vol. 8, p. 3233 (1993); Oberlin, A. and Endo, M., *J. of Crystal Growth*, Vol. 32 (1976), pp. 335-349; U.S. Pat. No. 4,663,230 to Tennent; U.S. Pat. No. 5,171,560 to Tennent; Iijima, Nature 354, 56, 1991; Weaver, Science 265, 1994; de Heer, Walt A., "Nanotubes and the Pursuit of Applications," *MRS Bulletin*, April, 2004; etc. All of these references are herein incorporated by reference.

Commercially known processes for forming multi walled carbon nanotubes are high in selectively (e.g., produces greater than 90% multi walled carbon nanotubes in product) as well as yield (e.g., produces 30 pounds of multi walled carbon nanotube produce per pound catalyst).

Processes for making single walled carbon nanotubes are also known. E.g., "Single-shell carbon nanotubes of 1-nm diameter", S Iijima and T Ichihashi *Nature*, vol. 363, p. 603 (1993); "Cobalt-catalysed growth of carbon nanotubes with single-atomic-layer walls," D S Bethune, C H Kiang, M S DeVries, G Gorman, R Savoy and R Beyers *Nature*, vol. 363, p. 605 (1993); U.S. Pat. No. 5,424,054 to Bethune et al.; Guo, T., Nikoleev, P., Thess, A., Colbert, D. T., and Smally, R. E., Chem. Phys. Lett. 243: 1-12 (1995); Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996); Dai., H., Rinzier, A. G., Nikolaev, P., Thess, A., Colbert, D. T., and Smalley, R. E., Chem. Phys. Lett. 260: 471-475 (1996); U.S. Pat. No. 6,761,870 (also WO 00/26138) to Smalley, et. al; "Controlled production of single-wall carbon nanotubes by catalytic decomposition of CO on bimetallic Co—Mo catalysts," *Chemical Physics Letters,* 317 (2000) 497-503; U.S. Pat. No. 6,333,016 to Resasco, et. al., etc. All of these references are hereby by reference.

However, unlike multi walled carbon nanotube technology, currently known processes for forming single walled carbon typically are unable to reach industrially acceptable levels of selectivity and yield under commercially viable reaction conditions. For example, in Maruyama, et. al. "Low-temperature synthesis of high-purity single walled carbon nanotubes from alcohol," *Chemical Physics Letters,* 360, pp. 229-234 (Jul. 10, 2002), herein incorporated by reference, a method is disclosed for obtaining high purity single walled carbon nanotubes under vacuum or extremely low pressure (e.g., 5 Torr). Maintaining such extremely low pressure conditions on an industrial scale reactor would not be commercially viable. Other references such as U.S. Pat. No. 6,333,016 to Resasco also disclose high selectivity for single walled carbon nanotubes, but fail to show a commercially viable yield.

As such, there is a need for a method for producing single walled carbon nanotubes with industrially acceptable levels of activity, selectivity and yield under commercially viable reaction conditions.

SUMMARY OF THE INVENTION

The present invention provides methods of preparing single walled carbon nanotubes comprising contacting a carbon containing gas with a supported metal catalyst under reaction conditions at a selectivity of at least 90% single walled carbon nanotubes and with a yield of at least 1 gram single walled carbon nanotubes/gram metal catalyst.

More specifically, the present invention provides a method for preparing single walled carbon nanotubes comprising the steps of calcining a support material at temperatures between 150° C. to 600° C., said support material having at least one planar surface; preparing a supported catalyst comprising a metal catalyst precursor and said calcined support material; optionally calcining and/or prereducing said supported catalyst; and contacting the supported catalyst with a carbon containing gas at reaction conditions sufficient to produce at least 90% single walled carbon nanotubes in an amount greater than 1 gram single walled carbon nanotubes per gram metal catalyst; wherein the pressure in said reaction conditions is greater than about one and less than about 10 atmospheres and the temperature in said reaction conditions is less than 800° C. It is preferred that the planar surface of the support material be in an oxidized state. To oxidize the planar surface of the support material which does not have any oxide or oxygen groups, (i.e., so as to have oxides present on the surface of the support material), it is preferred that the support material be oxidized prior to performing the process of the present invention. Suitable oxidation temperatures may be greater than 1000° C.

In an alternative embodiment, the calcining step may be performed after the step of preparing a supported catalyst. In yet a further embodiment, the calcining step may be performed both before and after the step of preparing a supported catalyst.

Preferred metal catalysts include Fe, Co, Ni, Ru, Rh, Pd, Os, Ir, Pt, Cr, W, Mo, Mn, Ni or mixtures thereof. Preferred support materials are in the form of platelets, wafers or planar substrates and are made from alumina ($Al_2O_3$), magnesia (MgO), silica ($SiO_2$), $Mg(Al)O_x$, $ZrO_2$, molecular sieve zeolite, glass, quartz, clay, hydrotalcite, talc, aluminum foil or silicon.

Preferred reaction temperature range is 400 to 800° C., more preferred 500-750° C., even more preferred 550 to 650° C. Preferred reaction pressure range is 0.5 to 10 atm, more preferred 1 to 5 atm, even more preferred 1 to 2 atm.

It should be understood that reagent gases are necessarily supplied at a pressure slightly in excess of the reaction zone pressure in order that they flow, without the aid of compression or other motive force into the reactor.

The support material may optionally be subjected to plasma treatment before being used to prepare the supported catalyst. Plasmas which may be used include those based on $F_2$, $O_2$, $NH_3$, He, $N_2$ and $H_2$, other chemically active or inert gases, other combinations of one or more reactive and one or more inert gases or gases capable of plasma-induced polymerization such as methane, ethane or acetylene.

In those systems where the source of carbon contains oxygen, preferred conditions also include maintaining a favorable oxidation potential in the reaction zone during the growth of the single walled carbon nanotubes by controlling the partial pressure of an oxidizing gas such as molecular oxygen, carbon dioxide or water. Where the source of carbon is a hydrocarbon, it is advantageous to maintain a level of hydrogen in the reaction gas in excess of the stoichiometric amount in the reaction taking place.

The invention also includes methods, systems and catalyst configurations which facilitate the harvesting of single walled carbon nanotubes from the catalyst either in the reaction zone or in a subsequent separation zone. Preferred catalyst particle configurations are described.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE PREFERRED EMBODIMENTS

Figure 1:
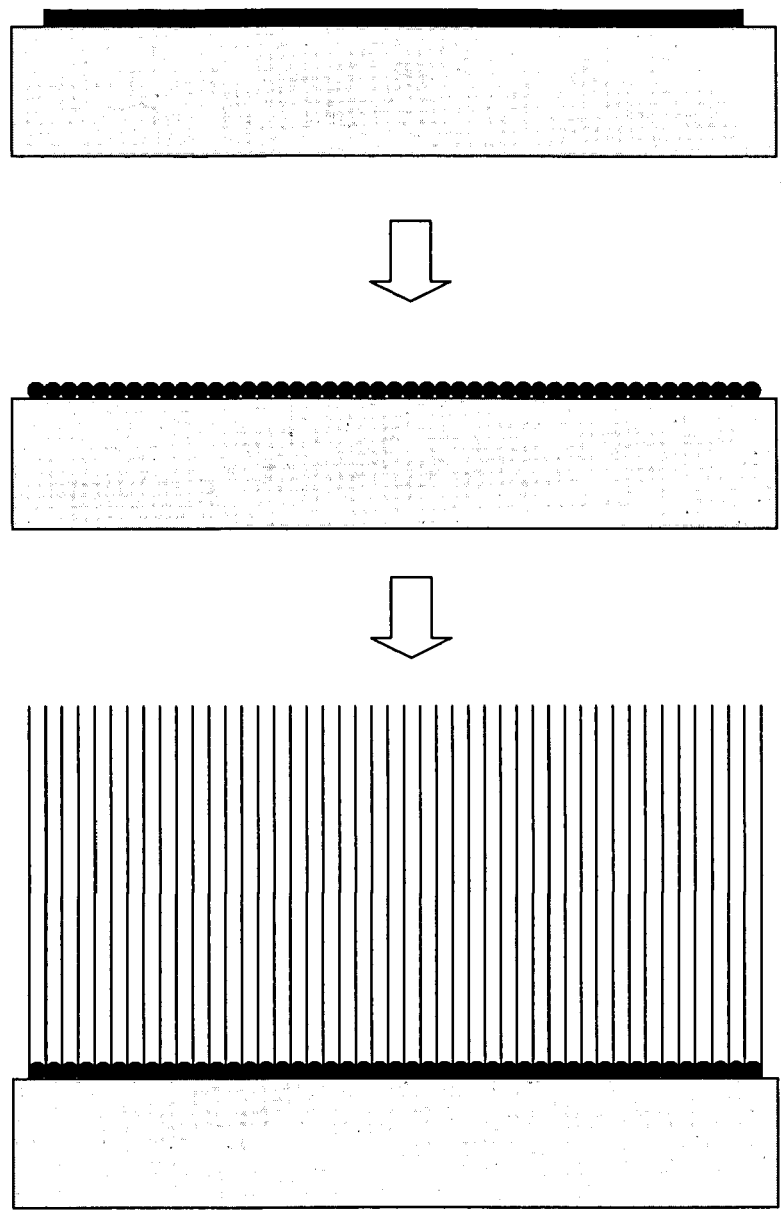
FIG. 1 is an illustration of the process for making a dense array of single walled carbon nanotubes on a planar substrate.

The present invention provides a new process for producing single walled carbon nanotubes which results in industrially acceptable levels of selectivity and yield under commercially viable reaction conditions.

In the preferred embodiment, there is provided a method for preparing single walled carbon nanotubes comprising contacting a carbon containing gas with a supported metal catalyst under reaction conditions to yield at least 90% single walled carbon nanotubes and at least 1 gram single walled carbon nanotubes/gram metal catalyst. Preferred reaction conditions include less than 800° C. and less than 10 atmospheres pressure.

The reaction can be conducted in any conventional reactor used to prepare carbon nanotubes.

The single walled carbon nanotubes produced in accordance with the preferred embodiment are typically free of any pyrolytically deposited amorphous carbon. The single walled carbon nanotubes have diameters ranging from 0.5 nanometer to 10 nanometers, preferably less than 5 nanometers, more preferably between 0.5 and 1 nanometer.

Furthermore, single walled carbon nanotubes may be grown as individual nanotubes or as aggregates of nanotubes (i.e., dense, microscopic particulate structure comprising entangled carbon nanotubes) or a mixture of both. Due to the high nucleation efficiency, the methods of the preferred embodiment permit single walled carbon nanotubes to be grown as densely packed arrays, bundles or ropes of single walled carbon nanotubes, or so-called "single walled nanotube forest." A "single walled nanotube forest" may comprise uniform or non-uniform substructures. For example, a forest may comprise multiple ropes of aligned single walled carbon nanotubes, and said ropes may have diameters of 2-20 nm, more preferably less than 10 nm. In the preferred embodiment, all of the individual single walled carbon nanotubes produced have similar or substantially identical diameters, and all the substructure ropes have similar or substantially identical diameters as well. The density of the array, bundle, rope or forest may be between $10^{16}$ to $10^{18}$ nanotubes/m$^2$. In one embodiment, the arrays or forests of single walled carbon nanotubes may be aligned parallel or substantially parallel to each other.

In one embodiment, the present process results in the growth of an array, bundle, rope or forest of single walled carbon nanotubes wherein at least 50% of the exposed surface area of the metal catalyst are covered with bases of single walled nanotubes. In another embodiment, the present process yields a nucleation efficiency greater than 75%.

Carbon Containing Gas

The carbon containing gas can be any gaseous carbon source such as a $C_1$ through $C_6$ compound having as hetero atoms H, O, N, S or Cl, optionally mixed with hydrogen. Carbon monoxide is preferred. Other useful carbon containing gases include, but are not limited to, unsaturated and saturated aliphatic hydrocarbons such as methane, ethane, propane, butane, hexane, ethylene, acetylene, propylene; oxygenated organic compounds such as acetone; aromatic hydrocarbons such as toluene, benzene and napthalene. Alcohols such as methanol, ethanol, propanol, etc. may also be used.

The carbon containing gas can be mixtures of any of the previously mentioned gases or can further include other gases such as hydrogen, nitrogen or inert gases. A preferred carbon containing gas is a mixture of carbon monoxide and hydrogen. The carbon containing gas can further include an oxygen containing component. Preferred oxygen containing components include $CO_2$, $H_2O$ or $O_2$.

The carbon containing gas may be delivered to the reactor using any conventional means. Furthermore, the carbon containing gas may be delivered as a continuous flow to the reactor as the reaction is being conducted continuously, or may be stored in the reactor prior to the reaction so that the reaction is conducted as a batch. The carbon containing gas may further be preheated to a desired temperature before delivering to the reactor or before the reaction is conducted.

Supported Metal Catalyst

Catalytically active metals for producing single walled carbon nanotubes include metals from the Group VIII (e.g., Fe, Co, Ni, Ru, Rh, Pd, Os, Ir, Pt) or Group VIb (e.g., Cr, W, Mo) metals. Preferred metals include Fe, Co, Mn, Ni, W and Mo. Analogues or derivatives of the catalytically active metals such as metal carbonyls (e.g., molybdenum carbonyls, iron carbonyls, etc.) may be also used. Mixtures of any of the catalytically active metals may also be used, including bimetallic or trimetallic combinations.

To form a supported metal catalyst, the metal catalyst is deposited onto a support using any conventionally known methods. Such methods typically include mixing, evaporating, and/or calcining the metal catalyst or metal catalyst precursor in the presence of the support material. Other methods include incipient wetness, impregnation, precipitation, co-precipitation, or chemical or physical adsorption. Alternatively, the support material may be contacted with or dipped into a solution containing the metal catalyst or metal catalyst precursor, and then dried and/or calcined.

It is preferred to use aqueous solutions of Fe or Co salts essentially undissociated in water, especially Fe and Co carboxylates. Aqueous solutions of Fe and Co acetate are particularly preferred. Mo is a preferred co-catalysts, also preferentially deposited from an aqueous solution of Mo carboxylate.

The support may be made from alumina ($Al_2O_3$), or magnesia (MgO). Other useful support materials include silica ($SiO_2$), Mg(Al)O$_x$, $ZrO_2$, molecular sieve zeolite, glass, quartz, clay, hydrotalcite, talc, aluminum foil, silicon and other known catalyst supports. It is preferred that the surface of the support contain oxygen or oxide groups. As such, a preferred support material is silica. The support material can be oxidized or otherwise treated using known methods to deposit oxygen containing groups or oxides onto the surface or planar surface of the support material. For example, silicon can be oxidized at temperatures greater than 1000° C. to form or create a silica surface.

The support may be in the form of aggregates of tabular, prismatic or platelet crystals. Alternatively, the support materials may consist of spherical particles or aggregates lacking cleavable planar surfaces (e.g., Degussa fumed alumina). In the preferred embodiment, the support is in the form of a platelet, wafer, or is of a form such that the support surface itself is planar (i.e., a planar substrate).

In the most preferred embodiment, the support material has at least one oxidized planar surface.

Other types of support materials include carbon nanotube structures such as carbon nanotube aggregates, three dimensional networks or rigid porous structures Carbon nanotube aggregates may be prepared by any conventional methods, including those disclosed in U.S. Pat. No. 5,165,909 to Tennent et al.; U.S. Pat. No. 5,456,897 to Moy et al.; Snyder et al., U.S. Pat. No. 5,707,916, filed May 1, 1991, and PCT Application No. US89/00322, filed Jan. 28, 1989 ("Carbon Fibrils") WO 89/07163, and Moy et al., U.S. Pat. No. 5,456,897 filed Aug. 2, 1994 and PCT Application No. US90/05498, filed Sep. 27, 1990 ("Battery") WO 91/05089, and U.S. Pat. No. 5,500,200 to Mandeville et al., filed Jun. 7, 1995 and U.S. Pat. No. 5,456,897 filed Aug. 2, 1994 and U.S. Pat. No. 5,569,635 filed Oct. 11, 1994 by Moy et al, all of which are hereby incorporated by reference. Rigid porous structures may be made using any conventional methods, including those disclosed in U.S. Pat. No. 6,432,866 to Tennent et al., hereby incorporated by reference. Three dimensional networks may be made using any conventional methods, including those disclosed in U.S. Pat. No. 5,968,650 to Tennent et al., hereby incorporated by reference.

Furthermore, before depositing or loading the metal catalyst, the surface of the oxidized support material may be need to be pre-treated to remove surface-adsorbed organics and/or moisture. One such pretreatment method is to treat with an alcohol solvent such as ethanol or propanol. A preferred pretreatment method is to subject the support material to plasma treatment with gases such as oxygen. Other plasmas may be used such as those based on $F_2$, $O_2$, $NH_3$, He, $N_2$ and $H_2$, other chemically active or inert gases or mixture thereof. Such plasma treatment may contribute to the oxidation of the surface.

Other known methods to increase the density of the oxygen groups on the surface of the support material such as chemical treatment or additional calcination in air may be used.

Reaction Conditions

An important aspect in the process of the preferred embodiment is that commercially feasible yields of single walled carbon nanotubes can be produced at reaction conditions (e.g., pressure, temperature) which are commercially viable.

In the context of pressure, it has been discovered that the process of the preferred embodiment can be carried out at, about, or near atmospheric pressure. This pressure condition would obviate the need for a vacuum or a pressure pump to artificially depressurize or pressurize the reaction chamber. Vacuum operation is particularly disadvantageous: not only is there a danger of inleakage of atmospheric air leading to an explosive situation, but the low density of sub-atmospheric gases limits the productivity per unit volume. Alternatively, the catalytic reaction can be conducted at less than 10 atmosphere, between 0.5 to 10 atmospheres, preferably between 1 to 5 atmospheres, or more preferably between 1 to 2 atmospheres.

Furthermore, in the context of temperature, it has been discovered that the process of the preferred embodiment can be carried out at relatively lower temperatures than those typical for forming carbon nanotubes via catalytic decomposition reactions. Preferably, the reaction is carried out at temperature below 800° C., more preferably between 500-750° C., even more preferably between 550 to 650° C. Other possible temperature ranges include 500-700° C. or 550-700° C.

A continuous process is preferred. It should be understood that a process can be continuous on gas and still batchwise on catalyst and solid phase products. A process continuous on gas phase adjusts the gas phase composition by separation steps external to the reaction zone and returns the remaining gas to the reaction zone. The gas may be cooled prior to separating out the net gas phase products of reaction and before recompression. Obviously, compression energy is reduced if the feed to the compressor is cooled. Before returning the recycle gas to the reaction zone it may be reheated. Net gas feed to be consumed in the reactor may be added to the recycle gas or may be added separately to the reactor.

Single wall carbon nanotubes can be efficiently produced by controlling the oxidation potential in the reaction zone. A preferred method of controlling the oxidation potential, where carbon monoxide is the carbon source, is to control the amount of carbon dioxide in the reaction zone. Since $CO_2$ is a product of the desired reaction, $$2CO \rightarrow C(SWT) + CO_2$$

this can be accomplished by adjustment of the reaction zone feed rate, purge rate and recycle rate, all of which is well within the skill of the art. It is believed that the $CO_2$ reacts with undesirable amorphous carbon which tends to poison the catalyst according to the reaction $$C\,(undesirable) + CO_2 \rightarrow 2CO$$

and thereby returns CO to the reaction mixture.

Other sources of oxygen which may be used to reduce the amount of undesirable carbon include molecular oxygen, $N_2O$ and water.

$$C(undesirable) + O_2 \rightarrow CO_2$$

$$C(undesirable) + N_2O \rightarrow N_2 + CO$$

$$C(undesirable) + H_2O \rightarrow H_2 + CO$$

Use of water in a carbon monoxide based system, however, may also produce hydrogen by the water gas shift reaction $$H_2O + CO \rightarrow H_2 + CO_2$$

In hydrocarbon based reactions, undesirable carbon forming on the catalyst may be removed by maintaining a hydrogen partial pressure in excess of the stoichiometric amount in the reaction being conducted $$hydrocarbon \rightarrow C(SWT) + H_2$$

These reactions are desirably carried out at non-vacuum, realistic operating pressures as discussed above. Good hydrogenation catalysts, e.g. those containing Pd, Pt etc. may promote this effect. Additionally, hydrogen spillover, i.e. transfer of absorbed hydrogen from the metal catalytic centers to the support may promote reaction with undesirable carbon. Spillover is a function of both catalyst metal and support.

It must be understood that in a process continuous on gas phase, it is possible to maintain a gas phase product of reaction at any desired level in the reaction zone without "adding" said component. For example, if CO is the carbon source, any level of $CO_2$ can be maintained in the reaction zone by suitable adjustment if the downstream separation steps. Even if the desired oxidant is not a product of reaction, only the fraction of that additive oxidant lost in the recycle processing, need be continuously added to the recycle or directly to the reactor.

The invention also includes methods and systems for harvesting single wall tubes from catalysts comprising a non-porous support and a substrate on which the single wall tubes have been grown. Generally, the supported catalysts, including all substrates, have a thickness of less than about 0.5 mm and preferably less than about 0.1 mm. After the single wall nanotubes have grown on the catalyst, the tubes can be harvested by breaking up the product into smaller aggregates and further processing them as described below.

Harvesting can be performed in several ways. In one method, the tubes are separated from catalyst support within the reaction zone. In another method they are separated from the catalyst support after the reaction step has been completed. In both methods the solid-solid separation may be performed using differential fluidization. In either method, recycling catalyst from which the single wall tubes have been separated to the reaction zone may be advantageous.

In order to efficiently handle the supported catalyst and separate the tubes from it either within the reaction zone or in a subsequent separation zone, it will be advantageous if the catalyst support is in a cylindrical, spherical or cubic configuration. Desirably the cylindrical or spherical supported catalyst will have a minimum diameter of 0.25 microns and a maximum diameter approximately equal to the length of the single wall tubes that are grown. Preferred supports may have a maximum diameter of about 100 microns.

The lower level of supported catalyst particle diameter, 0.25 microns, is based upon the observation that non-porous catalyst particles have sufficient external surface area to serve as commercially useful substrates for single walled carbon nanotube growth without a separate harvest step. The upper level of supported catalyst particle diameter is based upon use of a separate harvest step and there the diameter is of the order of magnitude of the height of the SWTs grown on the external surface of the catalyst particle even though that limits the yield to substantially less than 100% allowing for density.

It is desirable to grow single walled carbon nanotubes of particular length and aggregate size in order to simplify the steps of harvesting the single walled carbon nanotubes and further processing them. In general, aggregates of more or less uniform size are easier to process. In addition, long, loosely-packed bundles of single walled carbon nanotubes can be avoided by limiting the length of the tubes. Accordingly, it is desirable to produce aggregates of single walled carbon nanotubes of more or less uniform aggregate diameter having a length less than 1 cm and preferably less than 5 mm.

In one process embodiment the supported catalyst will remain in the reaction zone and the aggregates of single walled carbon nanotubes will abrade off the catalyst particles and be removed from the reaction zone in the product gas stream. The removal of the aggregates from the catalyst particles by abrasion may be enhanced by including mechanical elements within the reaction zone.

Where the process includes a separate harvest zone, the gas exiting the reaction zone may or may not be cooled before it enters the reaction zone. In either case catalyst and gas exiting from the harvest zone may be recycled to the reaction zone.

The catalyst may be first classified and a purge stream removed before it is recycled. Likewise a purge stream may be removed from the gas stream or it may be treated to remove reaction products, e.g. $CO_2$ or $H_2$, before it is recycled.

Armed with the teachings of this application, other reaction conditions, such as reaction time, reactor size, etc., are all within the province of a skilled artisan to modify or adjust depending on the raw materials and desired result. A reasonable number of experiments is envisioned to maximize the yield with a particular carbon containing gas or supported catalyst, and are intended to fall within the scope of the preferred embodiment.

Raman Spectrum

Raman spectroscopy is a technique that enables one skilled in the art to characterize the materials under investigation. Conventionally, in generating a Raman spectrum, a particular wavelength of light, such as a laser beam, is shone onto the surface of the object. While most of the light is reflected off unchanged, a small portion typically interacts with the molecules in the object and is scattered and produces the Raman effect, which is collected to produce a Raman spectrum. Different materials have their own unique spectrum correlative to their presence, and thus, a Raman spectrum can be a useful analytical tool for identifying materials.

As such, Raman spectra are commonly used to identify the forms of carbon present in a carbonaceous product based on the presence of certain peaks at certain regions in the spectra. For example, the region known as the "G-band" at ~1580 $cm^{-1}$ is present in all types of graphite samples such as highly oriented pyrolytic graphite (HOPG), pyrolytic graphite, charcoal as well as single walled and multi-walled carbon nanotubes. A slight shift (~15 $cm^{-1}$) towards higher wavenumber was observed for samples with extremely small crystal sizes. The region known as the "D-band" (~1355 $cm^{-1}$; however, the position of this band has been known to depend strongly on the laser excitation wavelength) occurs when the material contains defects in the graphene planes or from the edges of the graphite crystal. The region known as "Radial breathing modes" or "RBM", typically below 300 $cm^{-1}$ were observed in single walled carbon nanotubes, where all the carbon atoms under go an equal radial displacement. See Dresselhaus, M. S., et al., "Single Nanotube Raman Spectroscopy," *Accounts of Chemical Research I*, vol. 35, no. 12, pp. 1070-1078 (2002), hereby incorporated by reference.

In the preferred embodiment, the process yields a product which produces a Raman spectrum in which the ratio of the peak area of the G-band to D-band is at least higher than 2, with the presence of RBM.

Electron Microscopy

Figure 3:
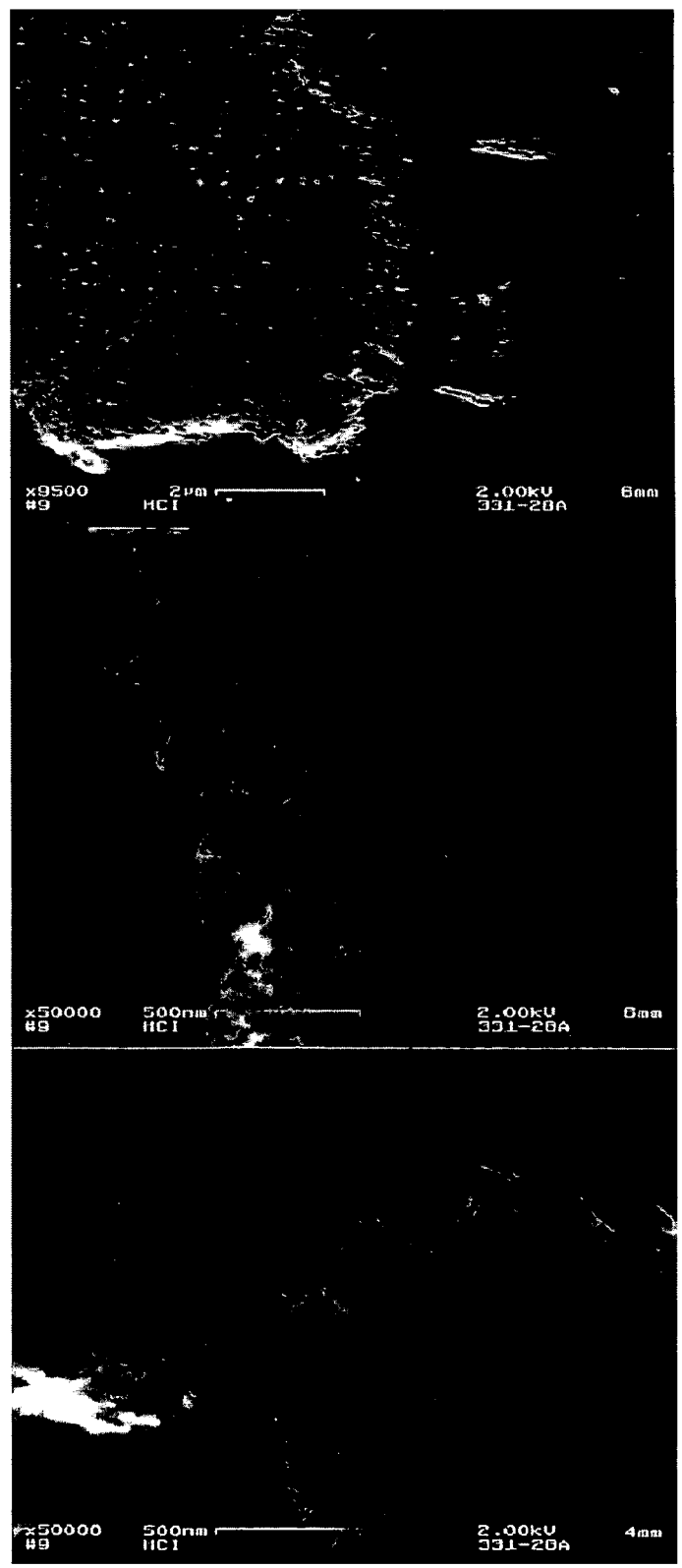
FIG. 3 displays scanning electron micrographs (SEM) of the dense array of single walled carbon nanotubes prepared at 600° C. in accordance with the present invention.
Figure 4:
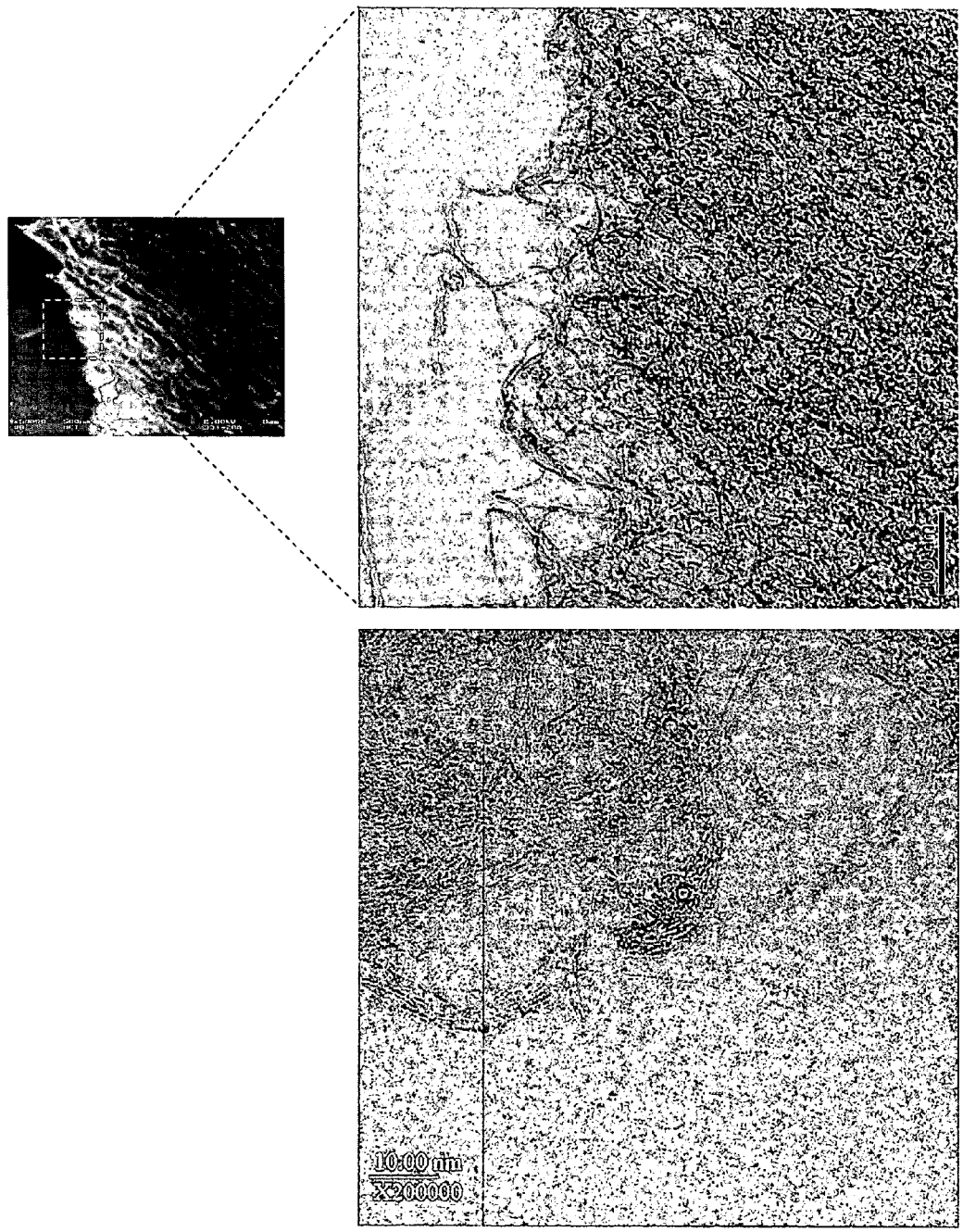
FIG. 4 displays transmission electron micrographs (TEM) of the dense array of single walled carbon nanotubes prepared at 600° C. in accordance with the present invention.

Another useful tool in analyzing the carbon product prepared from the process of the preferred embodiment is through electron microscopy. In electron microscopy, beams of electrons are irradiated onto the sample, and an image is produced based on the interaction between the electrons and the sample. In particular, two types of electron microscopes: transmission electron microscope ("TEM") and scanning electron microscope ("SEM") are commonly used to observe and characterize carbon nanotubes. Examples of the single walled carbon nanotubes produced in accordance with the preferred embodiment are provided in FIGS. 3 and 4.

EXAMPLES

The following examples serve to provide further appreciation of the invention but are not meant in any way to restrict the effective scope of the invention.

Example 1

Preparation of Supported Catalyst

A silicon wafer was cut to 1 cm×2 cm, and put in an oven and calcined at 1100° C. in air for 3-4 hours before being cooled to room temperature. After this treatment, the wafer exhibited dark blue color. The wafer was then cleaned in a ultrasonic bath containing 2-propanol for 5 minutes followed by air drying. The dried wafer was then treated in a mini oxygen plasma reactor for 5 minutes. An ethanol solution composed of 0.01 wt % Co and 0.01 wt % Mo was then deposited on this wafer via dip coating. The coated wafer was then dried and calcined in air at 450° C. in air for one hour.

Example 2

Preparation of Supported Catalyst 10 grams of silica gel material ($SiO_2$) having a surface area of 400 $m^2/g$ is calcined in air at 400° C. for 3 hours and allowed to cool to room temperature in a round bottom flask. An ethanol solution containing Co acetate and Mo acetate with each metal content of 2.5 wt % is introduced to the $SiO_2$ via incipient wetness impregnation. The catalyst is then dried at 120° C. in air and followed by calcinations in air at 400° C. for 2 hours.

Example 3

Preparation of Supported Catalyst 10 grams of silica gel material having a surface area of 400 $m^2/g$ is calcined in air at 400° C. for 3 hours and allowed to cool to room temperature in a glove-box and placed in a round bottom flask. An anhydrous ethanol solution of ferrous ethoxide with Fe content of 5 wt % is introduced to the flask and allowed to react with the silica support under constant agitation for 5 hours. The slurry is then filtered, dried at 120° C. and calcined in air at 400° C. for 2 hours. The sample is then further loaded with Mo by introducing an anhydrous ethanol solution of Mo ethoxide containing 5 wt % Mo into a flask and allowed to react with the support under constant agitation for 5 hours. The slurry is then filtered, dried at 120° C. and calcined in air at 400° C. for 2 hours.

Example 4

Preparation of Single Walled Carbon Nanotubes

The catalyst made in Example 1 was placed in a 1-inch quartz reactor and purged with argon for 30 minutes. 2% $H_2$/Ar replaced the purge gas while the reactor temperature was raised to 600° C. at 20° C./min. Once the temperature reached 600° C., the $H_2$/Ar mixture was replaced by a CO flow at 400 mL/min, and the reaction was allowed to proceed for 30 minutes. After cooling to room temperature in 2% $H_2$/Ar, preliminary examination of the wafer exhibited a black coating.

Example 5

Preparation of Single Walled Carbon Nanotubes

Procedure described in Example 4 is repeated for the catalyst made in Example 2.

Example 6

Preparation of Single Walled Carbon Nanotubes

Procedure described in Example 4 is repeated for the catalyst made in Example 3.

Example 7

Raman Spectrum

Figure 2:
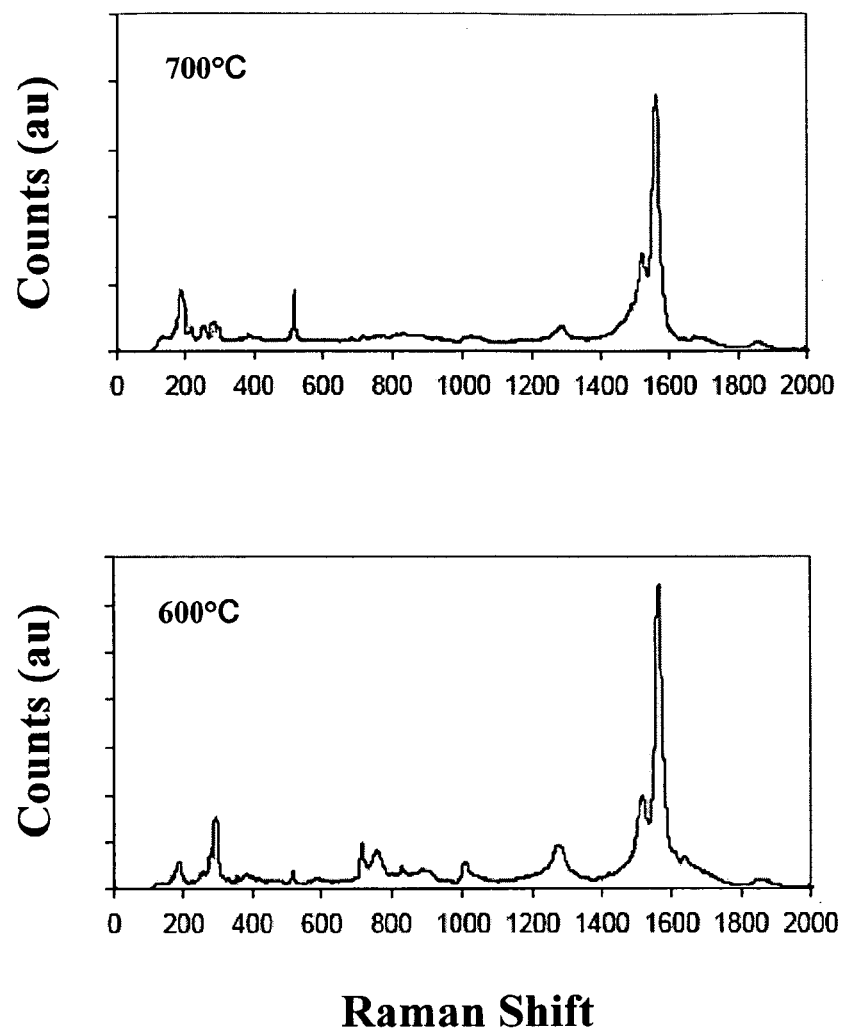
FIG. 2 displays representative Raman spectra of products formed at 600° C. and 700° C. in accordance with Examples 4-6.

Raman spectrum of the product from Example 4 was recorded and a representative pattern was shown in FIG. 2, which exhibited characteristic single-walled nanotube features.

Example 8

Electron Microscope

Sample 4 was subsequently examined by combination of SEM and HRTEM (High resolution transmission electron microscope) to identify the morphology of the products. Both studies indicated that the products are composed of single-walled carbon nanotubes with high purities and densities. These single-walled tubes are in the form of bundles or ropes that are substantially aligned and parallel to each other. The length of these bundles is in the range of 1-2 μm, and diameters are in the range of 0.6 to 1.5 nm.

Example 9

Supported Catalyst and Ethanol

Figure 5:
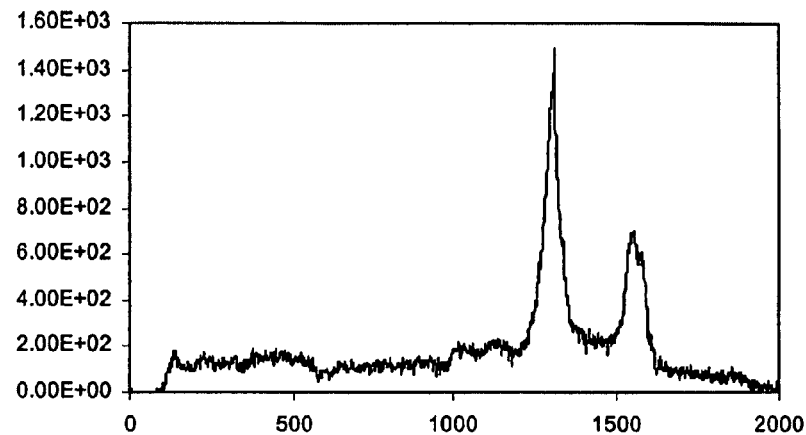
FIG. 5 displays a Raman spectrum of the products obtained in accordance with Example 9.

Supported catalyst was prepared with a Fe loading of about 15 wt % and placed into the reactor center at room temperature. 3% hydrogen in argon was passed through the reactor while raising the reactor temperature to 900° C. in about 30 minutes. Temperature of the reactor was lowered to 700° C. to promote tube growth. Ethanol vapor at 0° C. was delivered into the tube. Raman spectra is shown as FIG. 5 and reveals no peak at the RBM and large peak at the D-band.

Example 10

Supported Catalyst and Ethanol

Silicon wafers were oxidized with air at 1100° C. Wafers were sonicated in propanol, cleaned with plasma and dip coated in 0.01% solution Co acetate and Mo acetate with ratio of 1:1 at 2 cm/min lifting speed. The supported catalysts were then calcined at 450° C. for 1 hour.

Three sets of experiments, A, B and C, were performed.

Figure 6A:
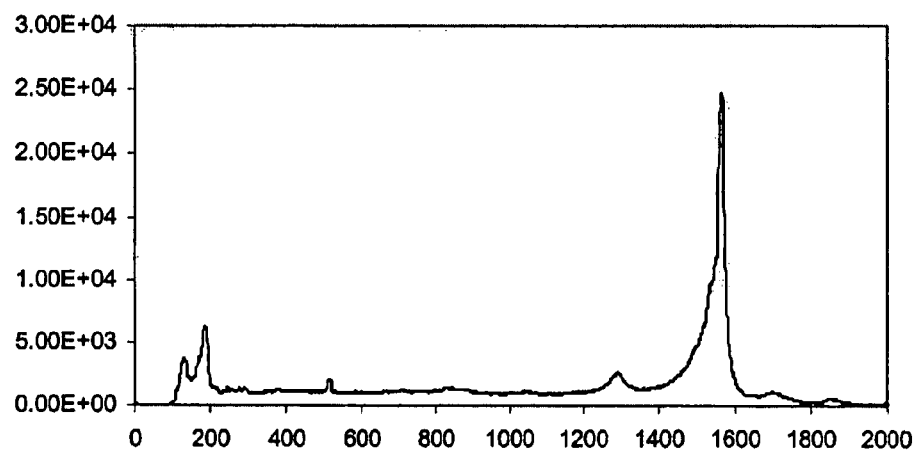
FIG. 6A-C displays the Raman spectra of the products obtained in accordance with Example 10.

In experiment A, ethanol vapor was provided to the reactor at a pressure of 7 mm Hg. The reactant concentration was controlled by passing 1000 mL/min 2% $H_2$/Ar through a liquid saturator containing ethanol kept at 0° C. and allowing just 70% of flow into the reactor via a gas splitter. The reaction was conducted at 800° C. for twenty minutes. Raman spectrum, displayed in FIG. 6A, revealed moderate peak at RMB and small peak at D-band. SEM showed thick single walled carbon nanotube mat in the order of 200-500 nanometers thick.

Figure 6B:
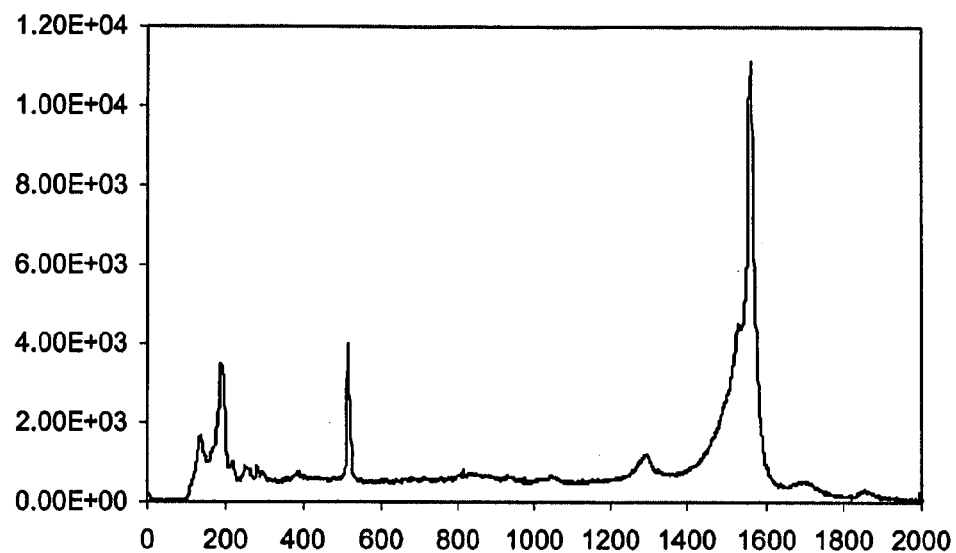

In experiment B, ethanol vapor was provided to the reactor at a pressure of 3 mm Hg. The reactant concentration was controlled by passing 1000 mL/min 2% $H_2$/Ar through a liquid saturator containing ethanol kept at 0° C. and allowing just 30% of flow into the reactor via a gas splitter. The reaction was conducted at 700° C. Raman spectrum, also displayed in FIG. 6B, and SEM observation confirms strong signal with good single walled nanotube selectivity and clean product with little or no amorphous carbon.

Figure 6C:
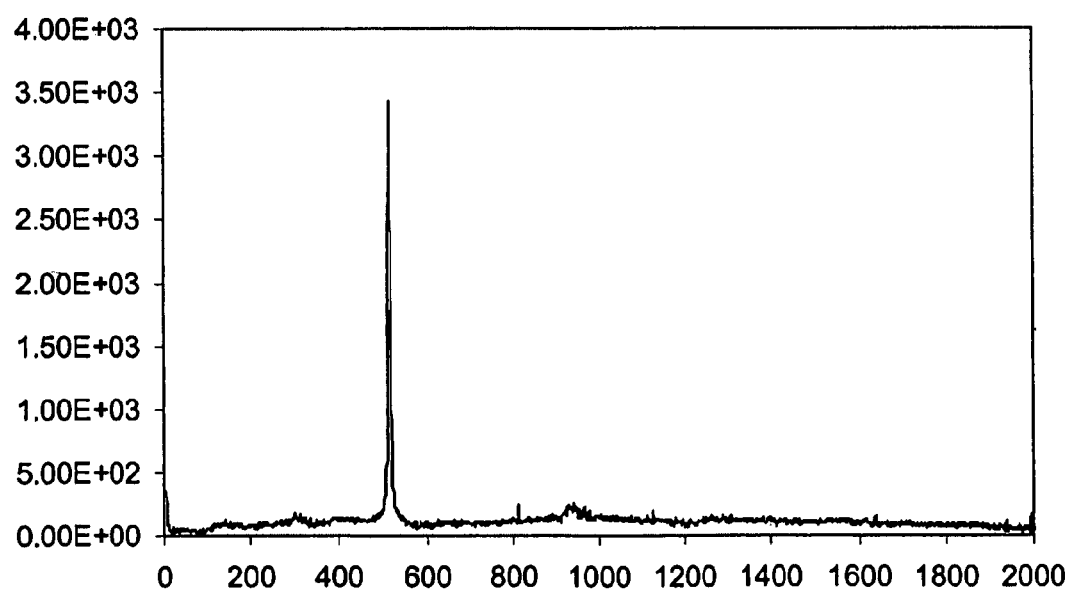

In experiment C, ethanol vapor was provided to the reactor at a pressure of 1 mm Hg. The reactant concentration was controlled by passing 1000 mL/min 2% $H_2$/Ar through a liquid saturator containing ethanol kept at 0° C. and allowing just 10% of flow into the reactor via a gas splitter. The reaction was conducted at 600° C. Raman spectrum, also displayed in FIG. 6C, showed weak signal at RBM.

Example 11

Supported Catalyst and Carbon Monoxide

Silicon wafers were oxidized with air at 1100° C. Wafers were sonicated in propanol, cleaned with plasma and dip coated in 0.01% solution Co acetate and Mo acetate with ratio of 1:1 at 2 cm/min lifting speed. The supported catalysts were then calcined at 450° C. for 1 hour.

Two sets of experiments, A and B, were performed.

Figure 7A:
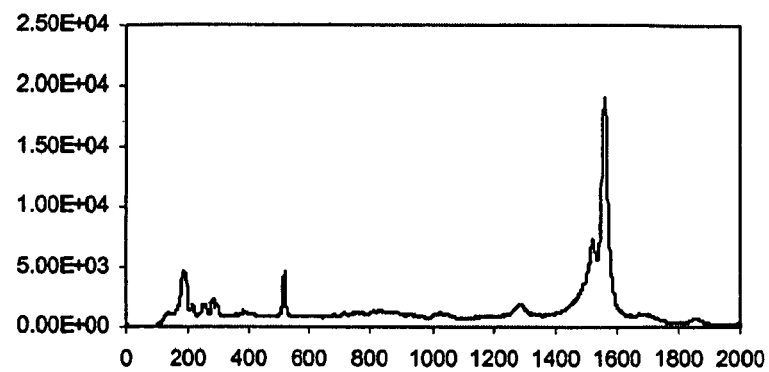
FIG. 7A-E displays the Raman spectra of the products obtained in accordance with Example 11.

In experiment A, the supported catalysts were first reduced in the reactor at 700° C. with 2% $H_2$/Ar gas. CO gas was provided to reactor at rate of 400 ml/min for 30 minutes. Raman spectrum, displayed in FIG. 7A, revealed good peak at both RBM and G band, and small peak at D-band.

Figure 7B:
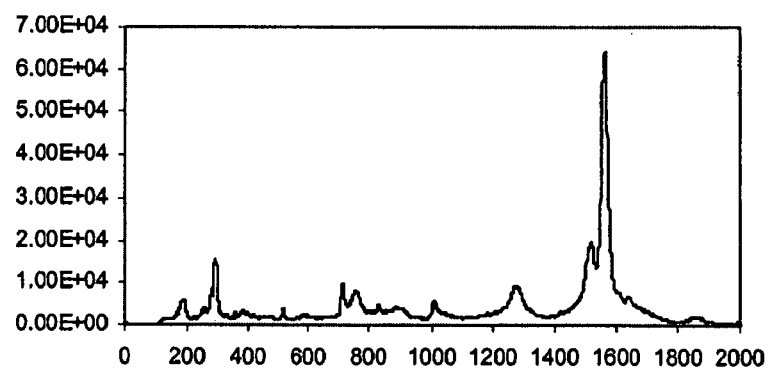
Figure 7C:
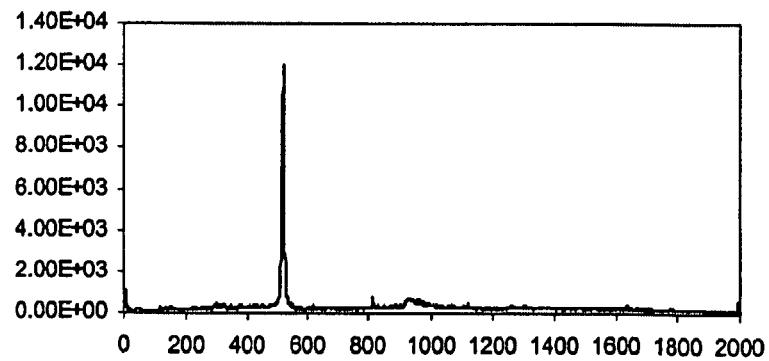
Figure 7D:
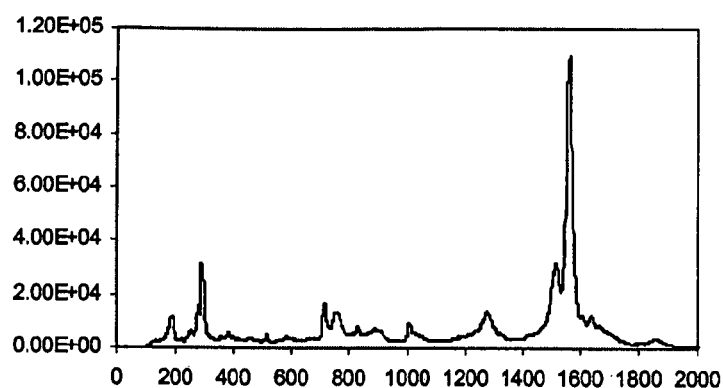

In experiment B, the supported catalysts were first reduced in the reactor at 600° C. with 2% $H_2$/Ar gas. CO gas was provided to reactor at rate of 400 ml/min for 30 minutes. Raman spectrum, displayed in FIG. 7B, revealed good peak at both RBM and G band, and small peak at D-band.

Figure 7E:
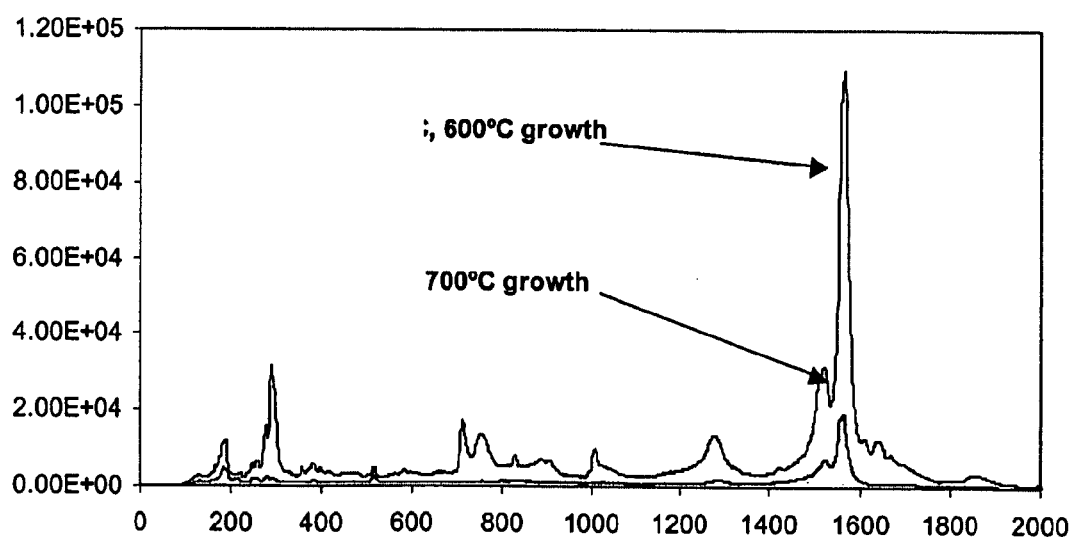

The Ramen spectra of from Experiments A and B were combined in FIG. 7E and illustrates a greater growth of carbon products at 600° C. than 700° C.

Example 12

Supported Wafer and Carbon Containing Gas

A piece of silicon wafer is heated to over 1000° C. for several hours and cooled to room temperature. The surface of the silicon wafer will turn blue. Other planar substrates may be used.

The wafer is dipped into an alcohol solution such as propanol and sonicated. The wafer is then treated with plasma.

The wafer is then dipped into a solution containing a metal catalyst. For example, a 0.01 wt % Co and 0.01 wt % Mo acetate solution. The wafer is then calcined in an oven at temperatures in excess of 400° C. in air.

The calcined wafer catalyst is then placed into reactor and contacted with a reduction gas mixture while the temperature is raised to a desired temperature range (e.g., 550-650° C.).

When the desired temperature is reached, the reduction gas mixture is replaced with a carbon containing gas such as CO. The carbon containing gas may be preheated. The reactor is cooled. The same reduction gas mixture may be reintroduced into the reactor.

The resulting wafer is expected to be black. The Raman spectra is expected to shows strong RBM and G band. SEM is expected to reveal clean single walled carbon nanotube growth.

The terms and expressions which have been employed are used as terms of description and not of limitations, and there is no intention in the use of such terms or expressions of excluding any equivalents of the features shown and described as portions thereof, it being recognized that various modifications are possible within the scope of the invention.

We claim:

1. A method for preparing single walled carbon nanotubes comprising the steps of:

preparing a supported catalyst comprising a metal catalyst and a support material, said support material having at least one planar surface, calcining said supported catalyst at temperatures between 150 to 600° C., contacting said supported catalyst with a hydrocarbon and hydrogen at reaction conditions sufficient to produce at least 90% single walled carbon nanotubes in the amount greater than 1 gram single walled carbon nanotubes per gram metal catalyst, wherein the pressure in said reaction conditions is greater than about one and less than 10 atmospheres, the temperature is less than 800° C. and the partial pressure of hydrogen is maintained in excess of the stoichiometric level for the reaction taking place by selective control of the reaction feed, purge and recycle rates, and adjusting gas phase products of the reaction by separation steps to provide a recycle gas that is recycled to the contacting step.

2. The method of claim 1, wherein the method is continuous.

* * * * *

UNITED STATES PATENT AND TRADEMARK OFFICE
CERTIFICATE OF CORRECTION

PATENT NO. : 8,287,836 B2  
APPLICATION NO. : 11/841952  
DATED : October 16, 2012  
INVENTOR(S) : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this
Eleventh Day of November, 2014

Michelle K. Lee
*Deputy Director of the United States Patent and Trademark Office*